United States Patent [19]

Senzaki

[11] 4,284,374
[45] Aug. 18, 1981

[54] ROTARY TOOL HOLDER

[75] Inventor: Chikara Senzaki, Nara, Japan

[73] Assignee: Manyo Tool, Nara, Japan

[21] Appl. No.: 28,392

[22] Filed: Apr. 9, 1979

[30] Foreign Application Priority Data

Jun. 8, 1978 [JP] Japan .................................. 53-68291

[51] Int. Cl.³ ............................................. B23B 47/24
[52] U.S. Cl. ................................. 408/139; 10/135 R;
10/141 R; 192/56 R
[58] Field of Search ............... 408/139, 9, 129; 64/29;
10/135 R, 141 R; 192/56 R

[56] References Cited

U.S. PATENT DOCUMENTS

| | | | |
|---|---|---|---|
| 1,401,594 | 12/1921 | Drowns | 408/139 |
| 1,593,732 | 7/1926 | Street | 408/139 X |
| 1,974,345 | 9/1934 | Scholtes | 10/135 R X |
| 2,429,091 | 10/1947 | Dodge et al. | 64/29 X |
| 3,307,664 | 3/1967 | Halsall | 64/29 |
| 3,521,314 | 7/1970 | Steiner | 408/139 |
| 3,787,136 | 1/1974 | Steiner | 408/139 |
| 3,791,756 | 2/1974 | Johnson | 408/139 |

FOREIGN PATENT DOCUMENTS 2303627 10/1976 France ..................................... 408/139
2303628 10/1976 France ..................................... 408/139
875488 8/1961 United Kingdom .................. 10/135 R Primary Examiner—William R. Briggs
Attorney, Agent, or Firm—Bruce A. Jagger

[57] ABSTRACT

A tool holder has a shank to be coupled to a machine spindle; a driven member adapted to receive therein a tool and having peripheral dents and recesses; a sleeve member for transmitting a torque from the shank to the driven member, the sleeve member having inclined slots and first balls loosely fitted in respective inclined slots; a spring-loaded, cup-shaped member having an inclined wall surface engageable with the first balls; and second balls lodged in respective recesses in the driven member, so as to impede the sliding movement of the cup-shaped member toward the first balls. When a tool receives an unusual rotational resistance during the rotation in the normal direction, then the sleeve member interrupts transmission of a torque to the tool, and in turn continues idling. The rotation in the normal direction, of the tool is resumed by rotating the sleeve member in the reverse direction and then in the normal direction. During the rotation in the reverse direction, of the sleeve member, a torque larger than that at the rotation in the normal direction, of the sleeve member is transmitted to the tool.

10 Claims, 14 Drawing Figures

F I G. 11
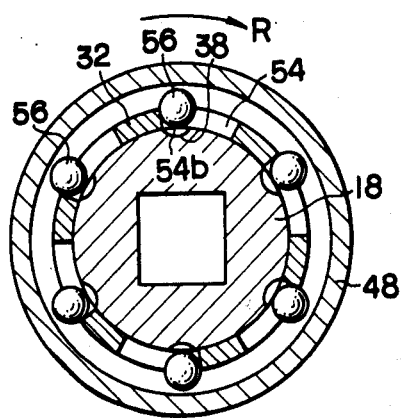
F I G. 12
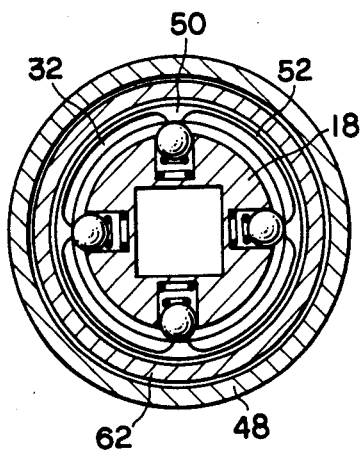
F I G. 13
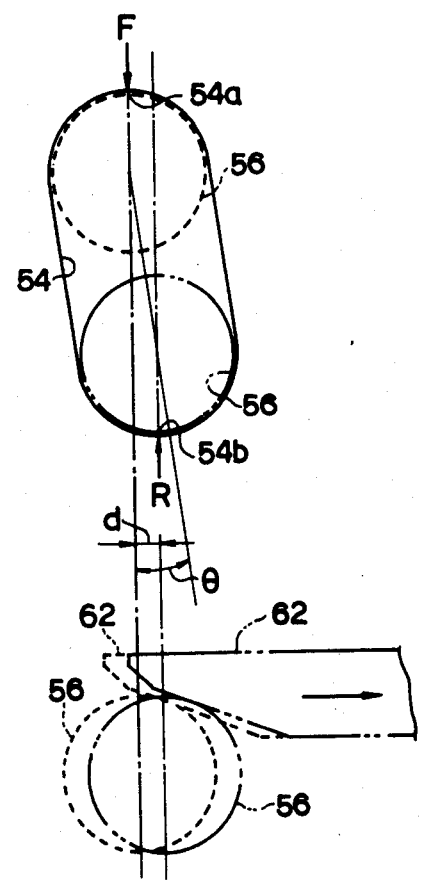

ROTARY TOOL HOLDER

BACKGROUND OF THE INVENTION

1. Field of the Invention

This invention relates to a rotary tool holder, and more particularly to a tool holder for limiting a torque to be transmitted by a spindle of a machine tool or the like to a tool, such as a drill, tap or reamer, within a range in which such a tool does not suffer from any damage or break.

2. Description of Prior Arts

In order to protect a tool from an unusually large torque due to an increased rotational resistance imposed by a workpiece, which torque would be a cause of damaging the tool, a variety of holders incorporated a different safety mechanism have hitherto been proposed.

One of prior art holders, which is disclosed in Japanese Laid-open Utility Model Publication No. Sho 51-113883, has been such that a rotary driving member to be coupled to a spindle and a driven member receiving therein a tool are connected to each other by a torque transmitting means having two or more balls; and such balls are usually maintained in engagement with grooves provided in the driven member at the transmission of a usual torque, but in the event of an unusually large torque being transmitted to the driven member, such balls disengage from these grooves to interrupt transmission of such an unusually large torque to the driven member. With such a holder, retransmission of a torque is achieved by the subsequent, angular idling of the torque transmitting means in the same direction as before, for reengagement of such balls with these grooves. However, retransmission of torque, stated otherwise, reengagement of such balls with these grooves, is accompanied by strong vibration. Such vibration occurs during the rotation in the normal direction, of the tool, stated otherwise, during the tapping, drilling or reaming operation for workpiece, thus resulting in the lowered precision in operation. Particularly such vibration that occurs during a tapping operation greatly impairs the precision in tapping.

It is generally known of the operation of a tap that, upon returning to its start position through its rotation in the reverse direction, the tap receives resistance due to chips of a work involved in the tap, having a likelihood of failing to be returned to its start position. To avoid this, a torque is needed, which is larger than that exerted on the tool at the rotation in the normal direction. For this purpose, there is desired a safety mechanism for providing a difference between a torque to be transmitted to the tool at the rotation in the normal direction of the tool and that at the rotation in the reverse direction thereof.

It is accordingly a primary object of the present invention to provide a rotary tool holder, wherein a tool is maintained independent of vibration even in the case of retransmission of a torque to the tool in operation, following the interruption of transmission of such torque.

It is another object of the present invention to provide a rotary tool holder, wherein in the event that transmission of a torque to a tool is interrupted during rotation in the normal direction, of the tool, then retransmission of a torque to the tool in operation cannot be realized unless the tool is rotated in the reverse direction.

It is a further object of the present invention to provide a rotary tool holder, wherein a torque to be transmitted to the tool at the rotation in the reverse direction is larger than that to be transmitted to the tool at the rotation in the normal direction.

It is a still further object of the present invention to provide a rotary tool holder, wherein a value of torque to be transmitted to a tool is variable, irrespective of a direction of rotation of the tool.

To attain these objects, there is provided according to the present invention a rotary tool holder which comprises; a rotary driving member adapted to be coupled to a spindle of a machine tool; a cylindrical driven member having an inner bore for receiving therein a tool, such as a drill, tap or reamer, a plurality of peripheral dents or shallow grooves spaced apart from one another in the circumferential direction of the driven member, and recesses adjoining to these dents; a sleeve member for transmitting a torque from the rotary driving member to the driven member and having first rolling members engageable with the dents, and a plurality of slots in which respective rolling members are adapted to be loosely fitted, the slots being arranged so as to displace the rolling members in the axial direction of the sleeve member, when rotation of the sleeve member is reversed; an outer sleeve member retaining the sleeve member on the driven member; a cup-shaped member slidably disposed between the sleeve member and the driven member and having a wall inclined radially inwardly thereof; resilient means for urging the cup-shaped member against these rolling members; and means disposed in the recesses in the driven member for releasably impeding a sliding movement of the cup-shaped member toward the rolling members. By such arrangements, transmission of a torque to a tool is interrupted during the rotation in the normal direction of the sleeve member, whereas the sleeve member continues idling. The idling of the sleeve member is terminated by reversing the rotation of the sleeve member; the sleeve member is then rotated in the normal direction so as to transmit a torque to a tool for its operation; and at the return or withdrawal of the tool from a workpiece through the rotation in the reverse direction, a torque larger than that at the rotation in the normal direction is transmitted to the tool, so as to prevent the tool from being damaged as well as to ensure the withdrawal of the tool from the workpiece.

BRIEF DESCRIPTION OF THE DRAWINGS

FIGS. 11 and 12 are transverse cross-sectional views of FIG. 10, which are similar to FIGS. 2 and 3, respectively;

FIG. 13 schematically shows the relationship between the displacement of a torque transmitting ball which arises when a direction of rotation of the sleeve member is reversed and the sliding motion of a cup-shaped member which is caused as a result of such displacement.

DESCRIPTION OF PREFERRED EMBODIMENT

Figure 1:
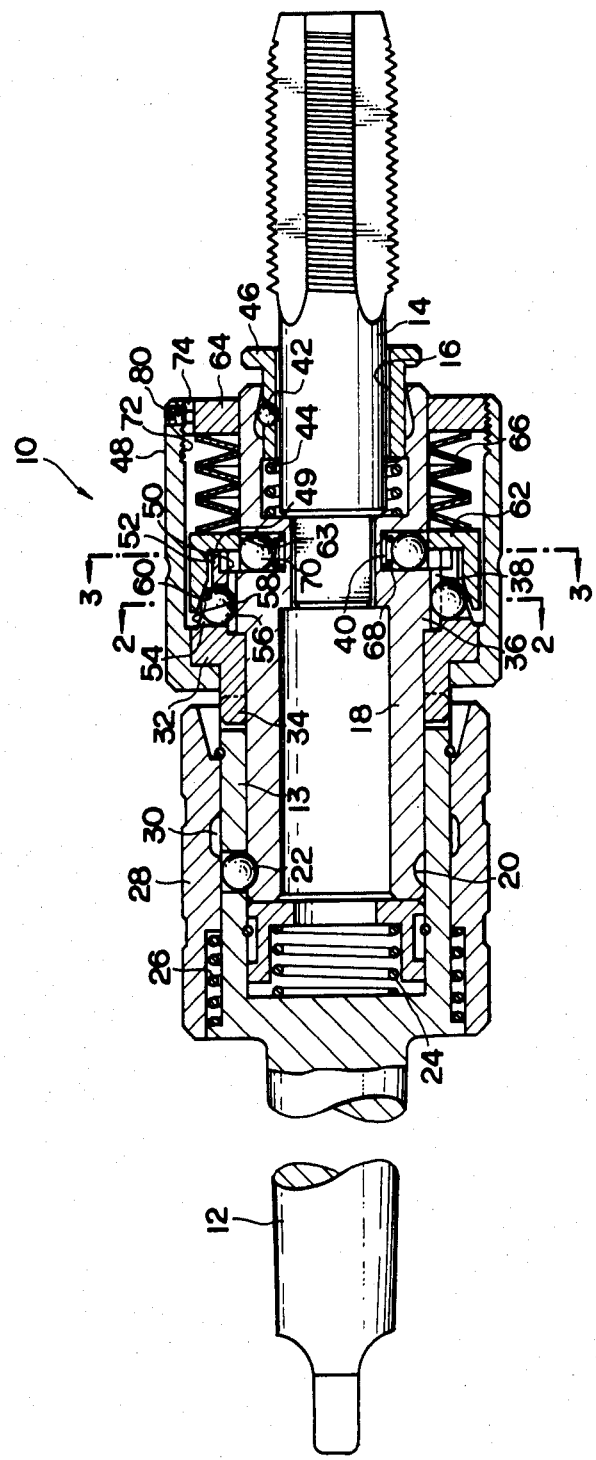
FIG. 1 is a longitudinal cross-sectional view of a rotary tool holder according to the present invention.

Referring first to FIG. 1, a rotary tool holder 10 according to the present invention includes a shank portion or a rotary driving member 12, which is removably secured at one end thereof to a spindle (not shown) of a drill press or a similar machine tool. The rotary driving member 12 is coupled to a cylindrical holder body, namely, a driven member 18, having a bore or hollow portion 16 for receiving therein a tool 14 such as a tap. The coupling of the driving member 12 to the driven member 18 is accomplished by engagement of balls 22 provided in a skirt portion 13 of the rotary driving member 12 with peripheral grooves 20 provided in one end portion of the driven member 18. The engagement of the balls 22 with the peripheral grooves 20 is accomplished by compressing a coil spring 24 of rotary driving member 12, so as to force one end portion of the driven member 18 into the rotary driving member 12. The connection between the driving member 12 and the driven member 18 is released by drawing the driven member 18 out of engagement with the rotary driving member 12, while a sleeve 28 fitted through the medium of balls 26 on the rotary driving member 12 is shifted in the axial direction of the holder body so as to move the balls 22 partly into recesses 30. The coupling of the driving member 12 to the driven member 18 is accomplished, rather than in a torque transmitting relation, by connecting the skirt portion 13 of the driving member 12 to a sleeve member 32 having a coupling portion 34 and fitted on the driven member 18 in the manner to be hereinafter described.

Figure 2:
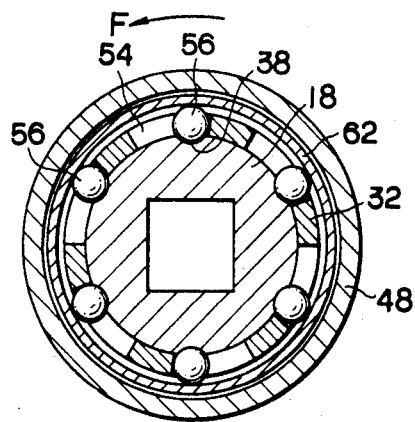
FIG. 2 is a transverse cross-sectional view taken along the line 2—2 of FIG. 1.
Figure 3:
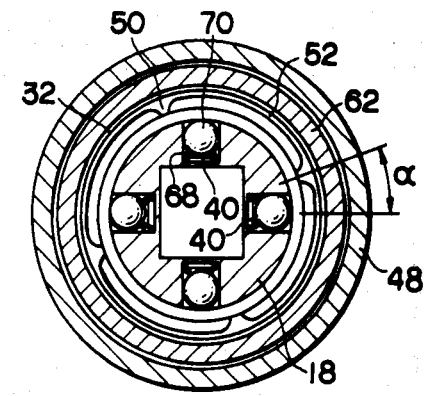
FIG. 3 is a transverse cross-sectional view taken along the line 3—3 of FIG. 1.

The driven member 18 has an outer-diametrically enlarged portion 36, in the outer peripheral wall of which a plurality of shallow grooves or dents 38 (six grooves in the embodiment shown) run in the axial direction of the member at a spacing from one another in the circumferential direction of diametrically enlarged portion 36 (FIG. 2). Each dent 38 has a round bottom. The driven member 18 further has two or more recesses 40 (four in the embodiment shown) in the outer peripheral surface adjoining to the outer-diametrically enlarged portion 36 (FIG. 3).

The driven member 18 has a socket 46 in general use fitted in the other end thereof, the socket serving to removably lock the tool 14 and having a ball 42 and a coil spring 44.

The sleeve member 32 fitted on the driven member 18 and retained thereon by an outer sleeve member 48 has two or more inner peripheral projections 50 (four projections in the embodiment shown) adapted to align with recesses 40, at an end 49 of the sleeve member which is opposite to the coupling portion 34 at which the outer sleeve is coupled to the rotary driving member 12. These projections 50 may be formed by cutting the inner peripheral wall of the other end of sleeve member 32 in a manner to form discontinuous thin wall portions 52.

The sleeve member 32 has a plurality of elongated slots 54 (six slots in the embodiment shown) spaced apart from one another on the outer peripheral surface thereof, in each of which is loosely fitted a ball 56 which is engageable with dent 38.

Figure 4:
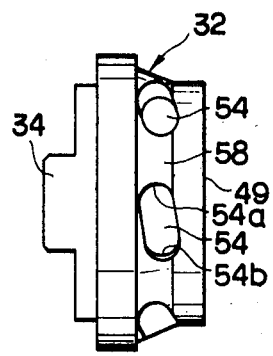
FIG. 4 is a plan view of a sleeve member constituting a torque transmitting means.
Figure 5:
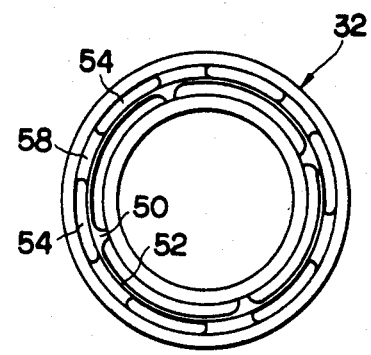
FIG. 5 is an end view of the sleeve member.

As is best seen in FIGS. 4 and 5, each slot 54 in the sleeve member 32 runs through a peripheral wall 58 thereof inclined toward the end 49 of the sleeve member at a certain angle with respect to the circumference of the sleeve member 32, stated otherwise, having an inclination with respect to the circumferential edges of the opposite ends of sleeve member (FIG. 13), in order to act in the manner to be hereinafter described.

The sleeve member 32 to be operatively connected to the rotary driving member 12 is the so-called running retainer, and constitutes means for connecting the rotary driving member 12 to the driven member 18, so as to transmit a torque from the former to the latter, in cooperation with the ball 56 adapted to be fitted in each dent 38 in the driven member 18 for engagement therewith.

A torque is transmitted from the sleeve member 32 to the driven member 18 while the balls 56 are retained in the dents 38, and the instant these balls 56 disengage from these dents 38, transmission of such torque is interrupted. A mechanism for retaining these balls 56 in respective dents 38 will be hereunder referred to. This mechanism consists of a cup-shaped member 62 slidably disposed between the outer sleeve member 48 and the driven member 18 and having a radially inwardly inclined wall surface 60 with which respective balls 56 are adapted to engage, and a spring 66 disposed between an end plate 64 of the outer sleeve member 48 and the cup-shaped member 62. The cup-shaped member 62 normally urges the balls 56 against one extremities 54a or 54b of slots 54 under the action of the spring 66, thereby restraining the rolling of these balls. So far as these balls 56 are arrested immovably under pressure of the cup-shaped member 62, the aforesaid transmission of a torque to the tool continues without interruption.

The holder 10 further comprises means for impeding a sliding movement of the cup-shaped member 62, so as to bring the cup-shaped member acting on the balls 56 to a released state. The means consist of coil springs 68 provided in the recesses 40 in the driven member 18 and balls 70 having a diameter as large as to be fitted in respective recesses 40. In case the balls 70 engage the projections 50 of the sleeve member 32 or for a duration which the balls 70 are in engagement with an inner peripheral wall 63 of the cup-shaped member 62, these balls are lodged in the recesses 40 to allow the sliding movement of cup-shaped member 62. On the other hand, when these balls are released from the engagement with the projections 50 of the sleeve member 32, these balls 70 are forced out of the recesses 40 under the action of the coil springs 68 to locate between the sleeve member 32 and the cup-shaped member 62, thereby impeding the sliding movement of the cup-shaped member 62 toward the balls 56, whereas these balls 56 are allowed to roll. Thus, the sleeve member 32 can no longer transmit a torque to the driven member 18, but is maintained in idling.

By proper selection of the spring 66, a force of restricting the balls 56 may be set beforehand. Selection of the spring 66 has a relation to determining a maximum torque to be transmitted to the tool 14.

The outer sleeve member 48 and the end plate 64 closing the axially outer end thereof are threaded with each other by means of an internal thread 72 provided in the inner peripheral wall of the axially outer end of the outer sleeve member 48 and an external thread 74 provided on the outer peripheral surface of the end plate 64. A predetermined extent of compression of the spring 66 is controlled according to a degree of rotation of end plate 64, thereby adjusting a restricting force to be imposed by the cup-shaped member 62 on the balls 56.

Figure 6:
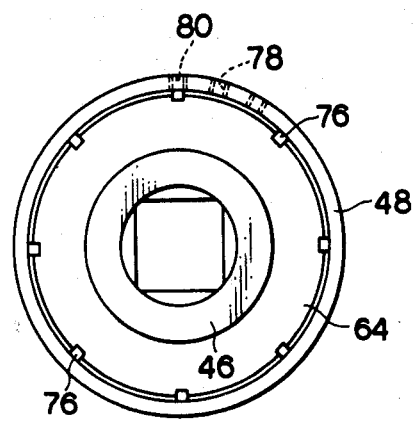
FIG. 6 is an end view of the tool holder.

The outer sleeve member 48 has a plurality of threaded holes 78 piercing through the axially outer end portion thereof, and axially movable end plate 64 has a plurality of threaded holes 76 angularly spaced apart from one another on the outer peripheral surface thereof, as best seen in FIG. 6. The outer sleeve member 48 and the end plate 64 are thus fastened together by bringing one of threaded holes 76 in the former into register with one of threaded holes 78 in the latter and by inserting a set-screw 80 into these holes in register.

Operation of the holder will be referred to in conjunction with FIGS. 2, 3, and 7 through 14.

Referring first to FIGS. 2 and 3, the torque transmitting balls 56 lodge in the dents 38 in the driven member 18, respectively, and the idling balls 70 are forced by radially inner peripheral wall 63 of the cup-shaped member 62 into the recesses 40 against the coil springs 68, so that the cup-shaped member 62 arrests the balls 56 in the dents 38. When the sleeve member 32 constituting a torque transmitting means is rotated in the normal direction as shown by an arrow F, then a torque will rotate the driven member 18 in the normal direction, thereby rotating tool 14 housed in the driven member in the normal direction. The tool 14 fulfills its inherent operation such as a drilling operation or a tapping operation for a workpiece during the rotation in the normal direction thereof.

Figure 7:
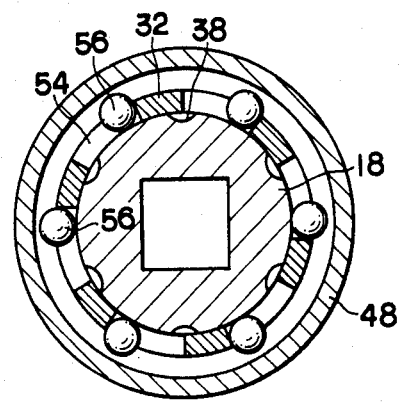
FIGS. 7 and 8 are transverse cross-sectional views at the idling of the sleeve member, which are similar to FIGS. 2 and 3, respectively.
Figure 8:
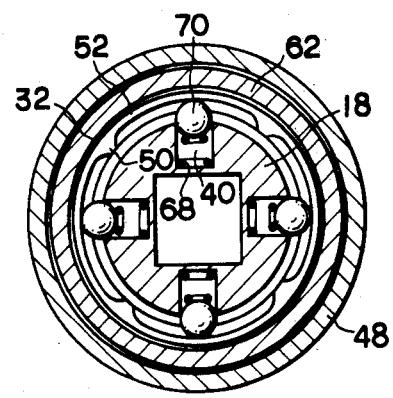
Figure 9:
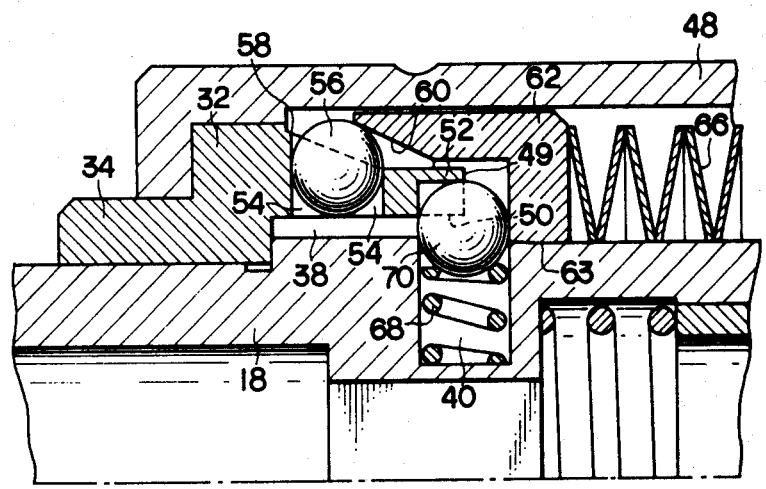
FIG. 9 is a fragmentary enlarged, longitudinal cross-sectional view of the tool holder at the idling of the sleeve member.

Resistance being imposed by a workpiece on tool 14 during rotation thereof increases degree by degree. When tool 14 receives a resistance so high as being unable to rotate even by a maximum torque preset by properly selecting the spring 66, then the sleeve member 32 overcomes the action of the spring 66 and rotates at such an angle as to dislodge balls 56 from the dents 38, as shown in FIG. 7. When the idling of the sleeve member 32 is caused, which does not transmit any torque to the driven member 18, the rolling of balls 56 will cause the cup-shaped member 62 to slide in the opposite direction against the force of the spring 66, whereby cup-shaped member will disengage from the balls 70. Consequently, the balls 70 are released from restriction to get between the sleeve member 32 and the cup-shaped member 62 under the action of the coil springs 68, in the manner shown in FIGS. 8 and 9, thereby impeding the sliding motion of the cup-shaped member 62 toward the balls 56. So far as the balls 70 assume the position shown in FIG. 8, the sleeve member 32 continues idling, and so far as the sleeve member continues to rotate in the same direction, any torque by no means is transmitted to the driven member 18. Retransmission of a torque cannot be realized unless the rotation of the sleeve member 32 is reversed.

In order to realize reengagement of the balls 56 with the dents 38 by reversing the rotation of the sleeve member 32, the sleeve member need be rotated in the reverse direction through an angle including an angle $\alpha$ as shown in FIG. 3 (an angle through which the sleeve member 32 is rotated relative to the driven member 18) and an angle corresponding to a length in the circumferential direction, of each slot 54. The reason is that, as shown in FIG. 4, one extremity 54a of each elongated slot 54 engages each ball 56 at the rotation in the normal direction of the sleeve member, and the other extremity 54b of each slot engages ball 56 at the rotation in the reverse direction thereof.

Figure 10:
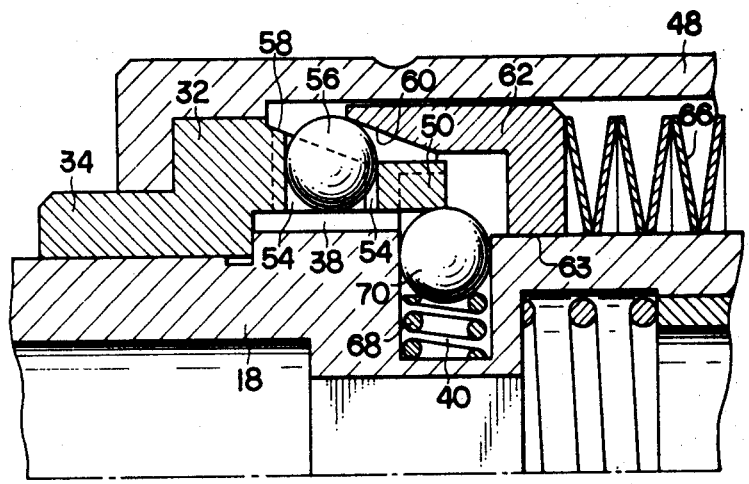
FIG. 10 is a fragmentary, longitudinal cross-sectional view of the tool holder in the state immediately before retransmission of a torque is caused by the rotation in the reverse direction of the sleeve member.
Figure 14:
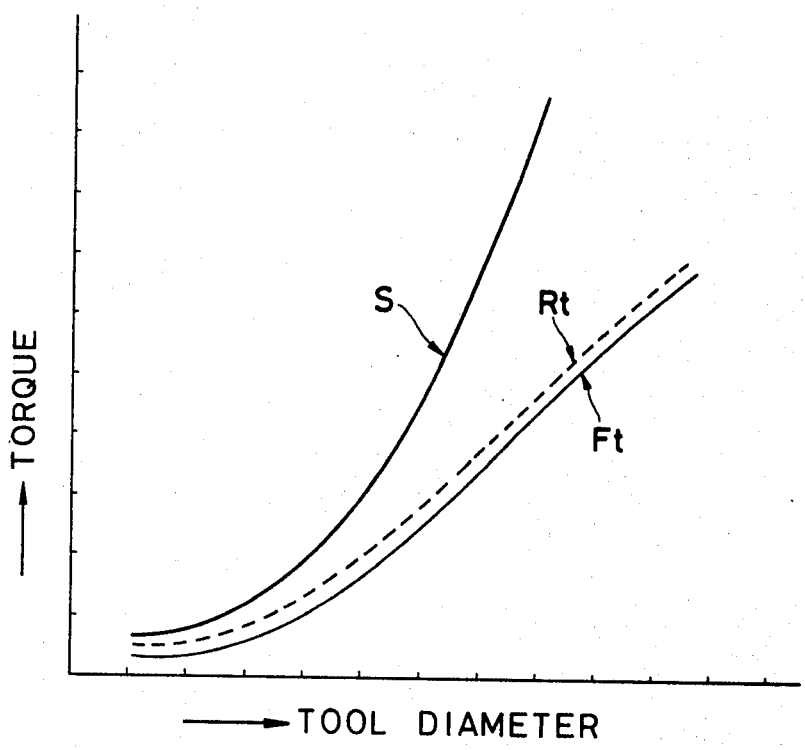
FIG. 14 is a plot representing the relationship among a tool destructive torque, a normal rotational torque and a reverse rotational torque, wherein a tool diameter is represented on the abscissa, and a torque to be transmitted to a tool is on the ordinate.

FIGS. 10, 11 and 12 show the situation of ball 56 immediately before reengagement of the ball with the dent 38 as a result of rotation the sleeve member 32 being reversed in a direction as shown by an arrow R.

Rotation in the reverse direction, of the sleeve member 32 causes the projection 50 to force the ball 70 into the recess 40. When each ball 70 is again lodged in respective recess 40, the cup-shaped member 62 will resume a sliding movement toward balls 56, to thereby press the balls 70 by the inner peripheral wall 63 thereof, and at the same time, to exert a pressure on the balls 56, so as to arrest these balls in the dents 38, respectively. The sleeve member 32 is thus allowed to rotate in the reverse direction without interruption and without idling, thereby rotating the tool 14 in a direction to be returned to the start position. If the sleeve member at the position shown in FIGS. 10, 11 and 12 be rotated in the normal direction, then the tool 14 would be again rotated in the normal direction to continue a drilling or tapping operation for a workpiece.

In the meantime, rotation of the sleeve member 32 is reversed, with the accompanying substantial displacement of the balls 56 in the axial direction of the sleeve member, because of an inclination of the slots 54. This will be more clearly understood from FIG. 13. Since the slot 54 makes an angle of $\theta$ with respect to the circumference of the sleeve member 32, there is incurred a difference in distance d between a position for normal rotation at which each ball 56 engages one extremity 54a of the slot 54 and a position for reverse rotation at which the ball 56 engages the other extremity 54b of the slot 54, so that when rotation of the sleeve member is changed over from the normal direction as shown by an arrow F to the reverse direction as shown by an arrow R, then the ball 56 is displaced to the right (as viewed in FIG. 13) to thereby urge cup-shaped member 62 in the same direction, resulting in compression of the spring 66 to a further extent. This signifies increase in an amount of torque being transmitted at the rotation in the reverse direction of the sleeve member. The relationship of a reverse rotation torque Rt versus a tool diameter and a torque to be transmitted to a tool is such as plotted in FIG. 14, in comparison with a tool breaking strength S and a normal rotation torque Ft. Reverse rotation torque Rt should preferably be larger by 20 percent than normal rotation torque Ft. When rotation of the sleeve member is changed over from the reverse direction to the normal direction, balls 56 are displaced in a direction to release the spring 66 from the aforesaid compressed state to a further extent. It thus follows that a value of torque to be transmitted from the sleeve member to the driven member differs at the rotation in the reverse direction of the sleeve member from that at the rotation in the normal direction thereof. Apparently the former is larger than the latter.

In the arrangements according to the present invention, once transmission of a torque from the sleeve member to the driven member has been interrupted by an increased resistance imposed by a workpiece on a tool, the sleeve member continues idling in the same direction as before, and retransmission of such torque is by no means caused unless rotation of the sleeve member is reversed. A vibration generation at the retransmission of a torque to the tool as a result of rotation of the sleeve member being reversed acts on the tool in a direction to be withdrawn from the workpiece, rather than in a direction to drill or tap the workpiece, thus having no likelihood of impairing a precision in performance of the tool.

When the tool is turned in the reverse direction for the returning to its start position, a torque larger than that at such as the drilling, tapping or reaming operation for the workpiece is transmitted to the tool, so that the tool can be returned accurately to its home position, without a risk that the tool is damaged as it is held in the work, which would ruin or damage both the tool and the work, as well as the holder itself.

I claim:

1. A rotary tool holder comprising:
a rotary sleeve member;
a cylindrical driven member received within said sleeve member and having a bore adapted to receive therein a rotary tool, a plurality of peripheral dents, and a plurality of recesses adjacent to said peripheral dents;
means for transmitting a torque from said sleeve member to said driven member, said means for transmitting a torque including rolling members engageable with said dents and two or more slots in said sleeve member, said respective rolling members being loosely fitted in said slots, said slots serving to displace said rolling members axially and circumferentially of said holder when rotation of said sleeve member is reversed;
a cup-shaped member disposed around said driven member, and having a wall surface convergent toward the axis thereof and engageable with said rolling members;
resilient means for urging said cup-shaped member against said rolling members; and
means disposed in the recesses in said driven member and adapted to releasably restrain the sliding movement of said cup-shaped member toward said rolling members.

2. A rotary tool holder according to claim 1, including means for adjusting the force with which said resilient means urges said cup-shaped member against said rolling members.

3. A rotary tool holder according to claim 1, wherein each of said dents has a bottom having a curvature substantially equal to that of each of said first rolling members.

4. A rotary tool holder according to claim 1, wherein said dents and said recesses in said driven member are adjacent to one another in the axial direction thereof.

5. A rotary tool holder according to claim 1, wherein said slots in said sleeve member extend through the peripheral wall of said sleeve member.

6. A tool holder comprising:
torque receiving means for receiving torque in both a first and a second direction from a driving member;
driven means for carrying torque from said torque receiving means toward a tool;
torque transmitting means for releasably interengaging said torque receiving means and said driven means and releasing such interengagement at a predetermined amount of rotational resistance which said rotational resistance is greater in said second direction than in said first direction;
idling means for holding said torque transmitting means in an unengaged configuration after releasing when rotating in said first direction; and
torque adjusting means for varying said predetermined amount of rotational resistance.

7. A tool holder comprising:
torque receiving means for receiving torque from a driving member in both a first direction and a second direction;
driven means for carrying torque from said torque receiving means toward a tool;
torque transmitting means for releasably interengaging said torque receiving means and said driven means and releasing such interengagement at a predetermined first amount of rotational resistance when rotating in said first direction and at a predetermined second amount of rotational resistance when rotating in said second direction, said second amount of rotational resistance being greater than said first such resistance;
torque adjusting means for varying said predetermined first amount of rotational resistance; and
idling means for holding said torque transmitting means in an unengaged configuration after releasing when rotating in said first direction.

8. A rotary tool holder comprising:
a rotary driving member;
a cylindrical driven member having a bore adapted to receive therein a rotary tool, two or more peripheral dents, and two or more recesses adjacent to said dents;
means for transmitting a torque from said rotary member to said driven member, said means for transmitting a torque including a sleeve member fitted on the outer periphery of said driven member and having a connection to said rotary driving member at one end thereof, a plurality of projections provided on the inner surface of the sleeve member, said projections being equal in number to and adapted to align with said recesses, and a plurality of slots extending angularly peripherally of said sleeve member, and rolling members in said slots, said rolling members being engageable with said dents in said driven member;
an outer sleeve member retaining said sleeve member on said driven member, and having a connection to said sleeve member on one axial side of said slots and an axially movable end plate connected to said outer sleeve member on the other axial side of said slots;
a cup-shaped member slidably disposed between said outer sleeve member and said driven member and having a wall surface convergent toward the axis thereof and engageable with said rolling members;
resilient means confined between said cup-shaped member and said end plate and adapted to urge said cup-shaped member against said rolling members; and
a spring and ball assembly disposed in each said recess in said driven member and being engageable with said cup-shaped member when said cup-shaped member is slidably moved toward said end plate to prevent said cup-shaped member from moving slidably away from said end plate, said spring and ball assembly being disengageable from said cup-shaped member by said projections.

9. A tool holder comprising:

torque receiving means for receiving torque in both a first and a second direction from a driving member;

driven means for carrying torque from said torque receiving means toward a tool;

torque transmitting means for releasably interengaging said torque receiving means and said driven means and releasing such interengagement at a predetermined amount of rotational resistance, said torque transmitting means including a plurality of ball members rollingly received in slots in said torque receiving means, a plurality of dents on the periphery of said driven means, said dents being adapted to releasably receive said ball members, a ball retaining member having a radially inwardly inclined wall, said inclined wall being engageable with said ball members to urge said ball members into interengagement with said dents, and a spring element urging said inclined wall into engagement with said ball members, said ball members being displaceable from said dents responsive to a predetermined amount of rotational resistance; and idling means for holding said torque transmitting means in an unengaged configuration after releasing when rotating in said first direction, said idling means including a plurality of detent members resiliently biased toward idling engagement with said ball retaining member to hold said torque transmitting means in said unengaged configuration, said detent members being normally held out of idling engagement with said ball retaining member and being positioned to move into idling engagement with said ball retaining member upon movement of said ball retaining member responsive to the displacement of said ball members from said dents whereby said ball retaining member is restrained by said detent members from urging said ball members into interengagement with said dents.

10. A tool holder of claim 9 including means for releasing said idling means upon rotation in said reverse direction.

* * * * *